Oct. 10, 1933.   R. L. CARR   1,929,409
VEHICLE CONTROL ARRANGEMENT
Filed June 15, 1929   3 Sheets—Sheet 1

Inventor
R. L. Carr

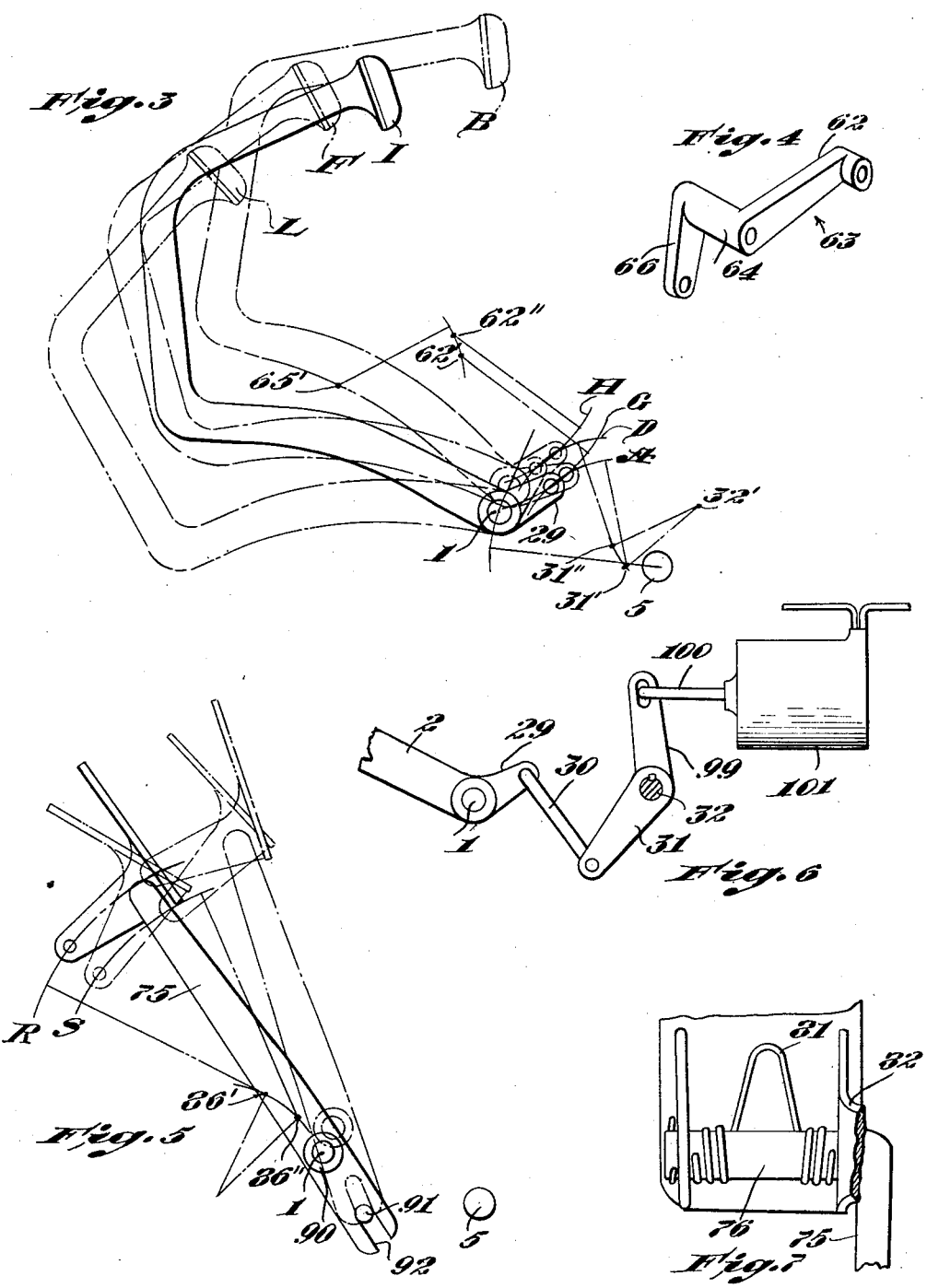

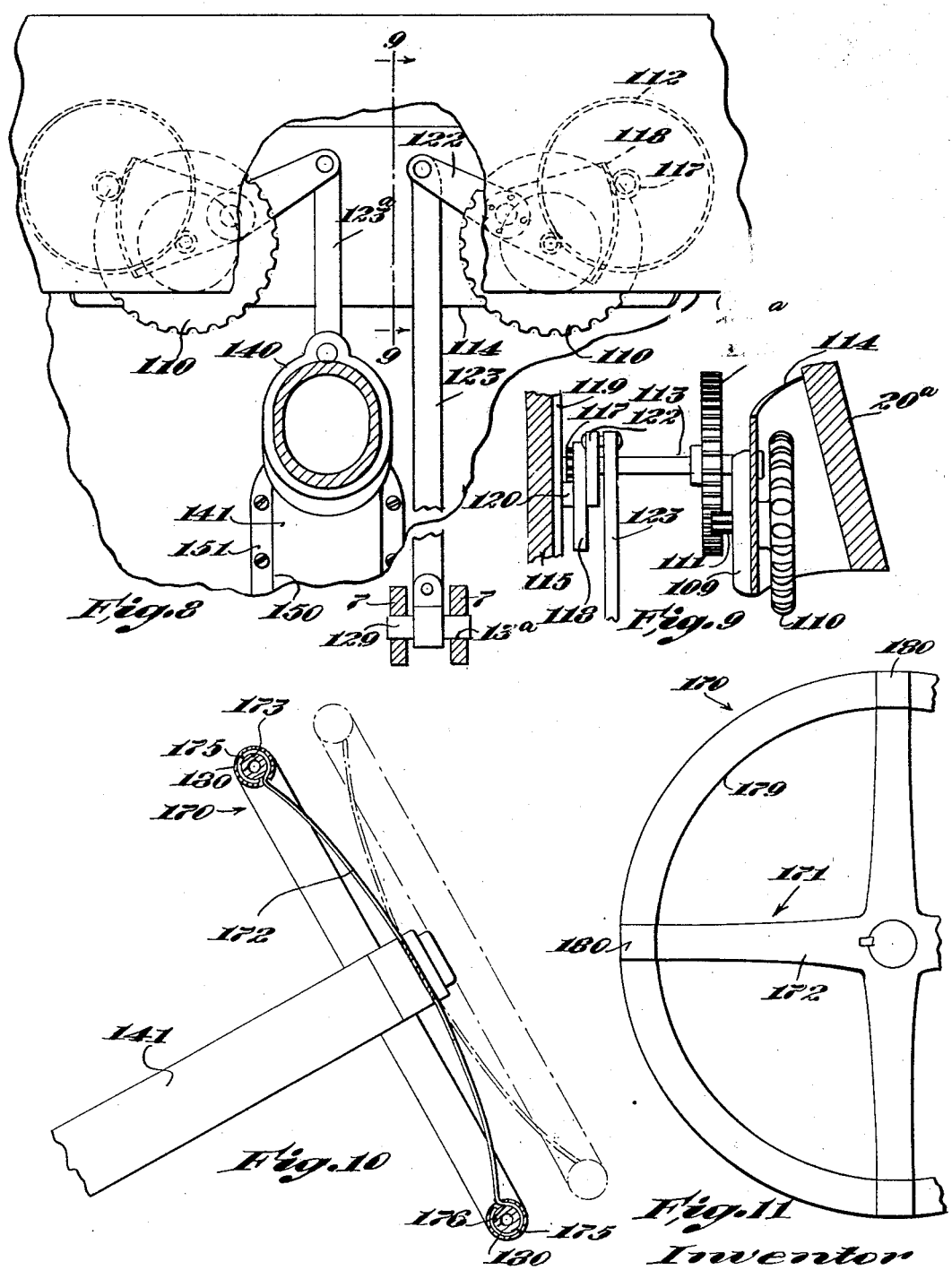

Patented Oct. 10, 1933

1,929,409

UNITED STATES PATENT OFFICE 1,929,409

VEHICLE CONTROL ARRANGEMENT

Raymond L. Carr, Boston, Mass.

Application June 15, 1929. Serial No. 371,164

16 Claims. (Cl. 180—77)

This invention relates to an improved arrangement of the controls which determine the course or path of a vehicle and the speed of the same. While this invention is particularly applicable to land vehicles, certain features thereof may also be advantageously employed for boats or aircraft.

The present invention is designed primarily to provide an adjustable control arrangement to afford the advantages that have heretofore only been attainable with a longitudinally adjustable seat, and to improve on the same in permitting the ready attainment of a comfortable driving position by all types of drivers, while avoiding the disadvantages that have attended the adjustable seat arrangements. Heretofore means have been provided permitting the separate adjustment of the control pedals such as the brake pedal and the clutch pedal, such means requiring the use of tools or laborious individual adjustment of each of the pedals. In accordance with the present invention, both the brake and clutch pedals as well as the throttle pedal or accelerator may be associated with a common support and be adjusted in unison. For this purpose I prefer to employ a control member such as a hand crank that is located in a convenient position remote from the pedals; for example, upon the instrument or cowl board of the vehicle. Accordingly with this arrangement a few turns of a manually operable control may be effective in adjusting the pedals a distance of several inches toward or away from the driver's seat. Such an arrangement is particularly advantageous when two or more people of different heights drive the same vehicle and it is desirable instantly to adjust the pedals to various positions.

Certain vehicles have been provided with longitudinally adjustable seats which permit variation of the position of the driver in relation to the controls. The provision of adjusting mechanism for this purpose has resulted in undesirable complications and often such mechanism is objectionable due to the difficulty of operation thereof, particularly when the seat is occupied. Furthermore, the cost of such an adjustable means is relatively high, while the framing for the body must necessarily be much more rigid when the seat itself can not be depended upon as a cross-brace, as is the case when the seat is made adjustable. In addition, the provision of a front seat which is not longitudinally adjustable is often advantageous, since it permits the provision of adequate leg room for the person occupying the seat beside the driver. A longitudinally adjustable seat is particularly unsatisfactory in two-seated vehicles having but one door upon each side, such as the conventional coach, due to the natural limitations upon ingress and egress resulting from the use of a single door. Thus the present invention may permit the use of a seat which is not longitudinally adjustable and accordingly may allow a more inexpensive and rigid body construction and a particularly satisfactory arrangement for adjusting the relative position of the controls and driver's seat in a body of the coach type.

In order to meet the requirements of all classes of users, it is desirable not only to provide for alterations in the relative positions of the control members, including the pedals and the steering wheel, and the seat, but also to provide for means for varying the relative position of the pedals and the steering wheel. An arrangement of this character is desirable in permitting the driver to occupy practically any desired position in relation to the various controls. I therefore prefer to arrange the steering wheel and column so that the position of the wheel may be varied in relation to that of the driver's seat, the control or controls for adjustment of the steering mechanism being independent of those employed for the pedals, thus permitting ready accommodation of the position of the controls to drivers of different sizes and to drivers who prefer to occupy different positions in relation to the controls and the seat. Preferably manually operable means is provided readily to permit a variation in the angle or rake of the steering column and thus in the angular position of the steering wheel in relation to the seat. Furthermore, I prefer to provide means also permitting the movement of the steering wheel rim longitudinally in relation to the steering column so that an adjustment is provided which is equivalent to varying the length of the column. Thus the driver of the vehicle is given a wide choice of possible positions of the steering wheel and of the control pedals in relation to each other and to the seat.

The above and further objects and advantageous features of the invention will be apparent to those skilled in the art upon a reading of the subjoined description and claims in conjunction with the accompanying drawings, in which:

Fig. 3 is a diagrammatic view showing the position of a control pedal, i. e. either the brake or the clutch pedal, at the extremes of its adjusted positions and both when fully released and fully depressed in these positions;

Fig. 4 is a perspective view of a crank member forming a part of the clutch control linkage;

Fig. 5 is a diagrammatic view similar to Fig. 3 but showing the various positions of the throttle pedal and the support therefor;

Fig. 6 is an elevational detail showing the manner in which the brake pedal may be employed in conjunction with a hydraulic braking system;

Fig. 7 is an elevational detail of a portion of the throttle pedal and the support therefor;

Fig. 8 is an elevational view, with parts broken away and parts shown in section, of an optional form of control mechanism for positioning the pedals and of a similar mechanism for varying the rake of the steering column;

Fig. 9 is a section on line 9—9 of Fig. 8;

Fig. 10 is a view partly in elevation and partly in section of the upper portion of the steering column and steering wheel; and Fig. 11 is a top view of a portion of the steering wheel.

Figure 1:
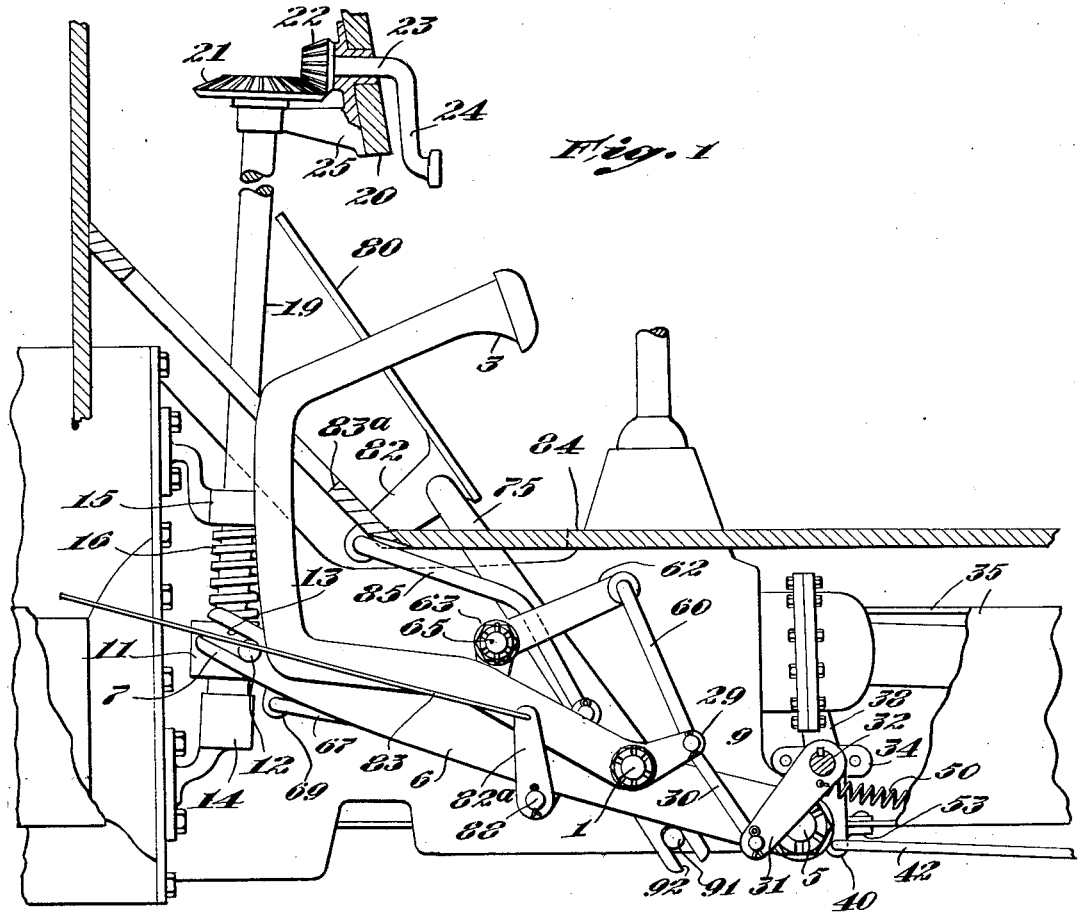
Fig. 1 is a side elevational view of a portion of a motor vehicle with parts broken away and in section clearly to show the positions of the pedals and the mechanism for controlling the position of the same and the linkage connected thereto.
Figure 2:
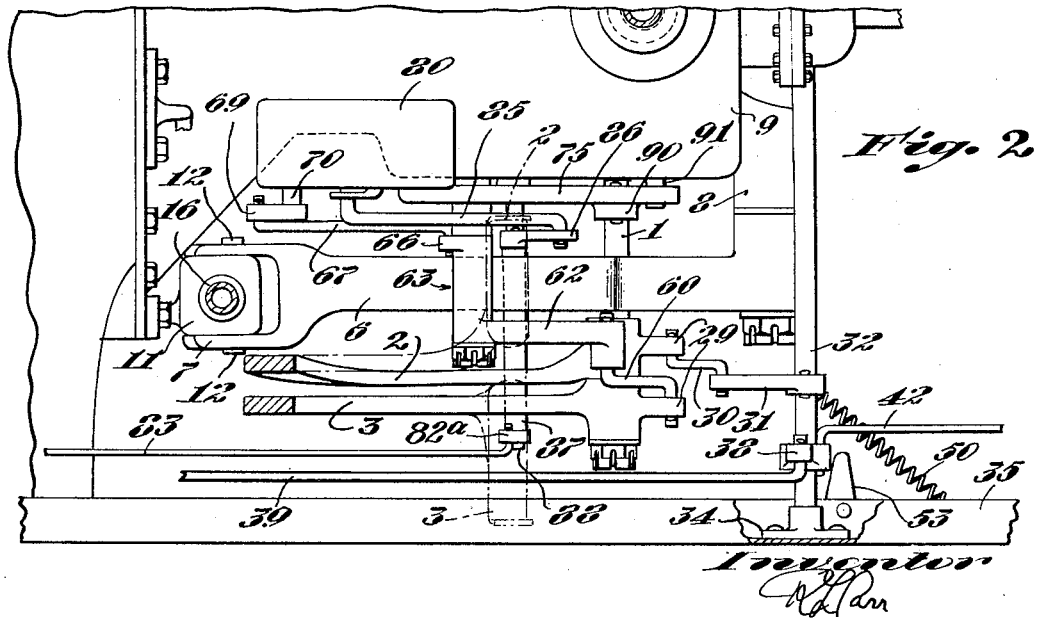
Fig. 2 is a top view of the assembly shown in Fig. 1, parts being removed and shown in dot and dash lines for clarity of illustration.

In accordance with the present invention, a common support preferably is provided about which the brake and clutch pedals may swing. Preferably this primary support also is associated with a secondary support for the throttle pedal. A variety of mechanisms may be provided to vary the position of the support and accordingly of the various pedals. Figs. 1 and 2 illustrate one arrangement wherein the primary support 1 comprises a horizontal shaft upon which the brake pedal 2 and the clutch pedal 3 are pivotally mounted. The primary support 1 preferably is fixed in a swinging arm 6, the rear end of which is pivotally mounted upon a stud 5 projecting from a boss 8 upon the transmission housing 9. The forward end of arm 6 may be provided with extensions 7 disposed in engagement with the opposite sides of a nut 11, suitable studs 12 being received in slots 13 in each extension 7 of arm 6. Suitable bearing elements 14 and 15 support a worm 16 which is threaded into nut 11. An upwardly extending shaft 19 may be integral with the worm 16 or connected thereto in any suitable way as, for example, by a flexible connection. This shaft 19 preferably has its upper end disposed behind the instrument board 20. Any suitable gearing may be arranged to rotate the shaft. For example, a beveled gear 21 may be keyed to the upper end of the shaft and mesh with a pinion 22 which may be mounted upon the inner end of a shaft 23 that extends through the instrument board and carries a hand crank 24. A suitable bracket 25 may be secured to the inner face of the instrument board to provide bearings for the shafts 19 and 23, as shown.

It is thus evident that operation of the crank 24 results in the rotation of the shaft 19 and worm 16 and consequently in a movement of the nut 11 along the worm, since the nut is prevented from turning by its engagement with the extensions 7 of the swinging arm 6. The studs 12 are effective in supporting the forward end of the arm in any one of a plurality of selected positions in accordance with the position of the nut 11. Since the primary support 1 for the pedals 2 and 3 is carried by the arm 6, the pedals are moved in response to the movement of the worm and nut. As shown, I prefer to locate the support 1 nearer the pivotal mounting 5 of the arm 6 than to the nut 11. Accordingly the primary support 1 has a comparatively limited movement corresponding to the maximum range of movement of the nut 11 and the forward end of arm 6.

The linkage connected with the pedals preferably is so arranged that it cooperates with the movement of the primary support 1 in causing the movement of the upper ends or foot-engaging portions of the pedals. Accordingly a comparatively small movement of the primary support 1 results in a much greater movement of the upper portion of the pedal. Furthermore, the linkage connecting the pedals to the brake and clutch mechanisms respectively is so arranged that in each one of the adjusted positions of the pedals the range of pedal movement from a fully released to a fully depressed position may remain substantially the same and so that the released pedals remain substantially beside each other throughout their movements through the various adjusted positions. For this purpose means may be provided yieldably to hold a portion of the control linkage in a fixed position whereby the movement of the primary support 1 in relation to this portion of the linkage causes a much greater movement of the upper portion of the pedals.

Figs. 1, 2 and 3 may be referred to for an illustration of one concrete method of arranging the linkage in this manner. Each of the pedals preferably is provided with an upwardly and rearwardly extending arm 29 which is provided with an opening to engage a suitable link. In the case of the brake pedal the link 30 which is engaged with the end of arm 29 is articulated to a crank 31 carried upon a main brake control shaft 32. This shaft may be mounted in brackets 34 secured to the longitudinal frame members 35 of the vehicle, and it may carry upwardly extending arms 38 connected to links 39 at opposite sides of the vehicle to control the front wheel brakes and downwardly extending arms 40, one of which is shown in Fig. 1, connected to links 42 that extend to the rear brakes.

A spring 50 connects arm 31 with a fixed portion of the vehicle, such as the frame member 35, thus tending yieldably to hold shaft 32 in a position wherein the depending arms 40 engage stops 53 carried by the vehicle frame. Accordingly as long as the brake pedal is released, the shaft 32 is held in a predetermined position so that the link 30 swings around the outer end of arm 31 as a center. This results, due to the angular arrangement of the pedal extension 29 in relation to the body portion thereof, in the movement of the upper portion of the pedal from the position marked B in Fig. 3 to the position marked I, these positions representing the location of the released pedal nearest to and farthest from the driver's seat.

Referring to Fig. 3, the symbol 32' indicates the center of the shaft 32, the symbol 31' indicates the position of the outer end of arm 31 when the brake is released, and the symbol 31'' indicates the position of the outer end of this arm when the pedal is fully depressed. It will be noted, referring to Fig. 3, that the link receiving openings of the pedal extensions 29 have their centers disposed in an arc A which has its center at 31' and that, due to this arcuate movement of this portion of the pedal, the upper portion thereof has a considerable range of movement in response to the comparatively restricted movement of the support 1 which, as shown in the full-line position, corresponds to the location of the pedal farthest from the driver's seat and in the dot and dash line position B is at the other extremity of its path.

Preferably the lower end of link 30 moves, upon depression of the pedal, in a path which is substantially perpendicular to the portion of the arc A through which the aforesaid portions of members 29 pass upon adjustable positioning of the pedal. The parts are so disposed that, when the pedal is depressed in any one of its adjusted positions, the aforesaid link receiving portion of the pedal extensions 29 will be effective in swinging the arm 31 through an equal angle in response to an equal depression of the pedal. Thus the dotted line representation L of the pedal shows the same depressed when it is in its position farthest from the driver's seat, and the showing marked F indicates its depressed position when it is adjusted to a location nearest the driver's seat. It will be noted that upon the maximum depression of the pedals in each of these positions the link receiving portions 29 thereof fall substantially along an arc D which is at the same distance from the point 31" as the arc A is from the point 31'. Accordingly the range of pedal movement and the amplitude of movement of the crank 31 and accordingly of the shaft 32 is substantially the same throughout the range of adjustments of the brake pedal supporting mechanism.

A similar arrangement preferably is employed for the clutch pedal 3, the extension 29 of which is connected to a link 60 that may be inclined upwardly and articulated to one arm 62 of a crank member 63 (Fig. 4), the body portion of which forms a sleeve 64 rotatable upon a stud or shaft 65 projecting from the transmission case. The inner end of this sleeve may carry a depending crank arm 66 which is articulated to a substantially longitudinal link 67 that in turn is pivotally connected to a crank 69 that is directly connected to the clutch throw-out mechanism by a shaft 70. It is thus evident that depression of the pedal 2 results in the upward movement of link 60, the rearward movement of link 67, and accordingly the swinging of the crank 69 and operation of the clutch throw-out mechanism in the conventional manner, any suitable spring and stop means being associated with this mechanism in the conventional or any desired manner and performing the same function as that afforded by the stop 53 and spring 50 for the brake pedal so that the clutch control linkage, including the arm 62, is yieldably held in one position as long as the clutch pedal is in its released position, although the pedal may be adjusted to a plurality of positions.

Fig. 3 may also be referred to for an understanding of the layout of the clutch control linkage, the point 65' indicating the center of the stud or shaft 65 about which crank member 63 rotates, the point 62' indicating the connection of the link to the outer end of the crank 62 about which the extension 29 of the released clutch pedal swings when the primary support 1 is moved in relation to the center 5. It is thus evident that the arc G has its center at 62' and forms the locus of the link receiving portion of the extension 29 of the clutch pedal. Preferably the arm 62 is so arranged that when depressed its outer end moves through a path substantially at right angles to the portion of the arc G in which the aforesaid portion 29 of the clutch pedal is disposed. The symbol 62" indicates the position of the link receiving portion of the outer end of arm 62 when the clutch pedal is fully depressed. An arc having 62" as its center and having a radius equal to the arc G passes through the center of the link receiving portions of the pedal when it is fully depressed in any of its adjusted positions, such an arc being indicated by the symbol H.

While in the foregoing description I have referred to the centers of the arcs and the various lines as exactly intersecting each other or the various points being disposed along arcs, it is to be understood that the above statement need be only approximately true to permit satisfactory operation of the linkage. In other words, instead of the center of the link receiving portion of one of the pedals 29 being exactly on one of the arcs A, D, G or H, it may be disposed substantially upon the same.

An inspection of Fig. 3 indicates that the restricted portions of the arcs G and A which extend between the extreme positions of the link receiving portions of the pedals are not exactly superimposed but are in close juxtaposition to each other. Since the position of these arcs determine the positions of the upper portions of the pedals in various intermediate adjusted positions, the released pedals will not be exactly beside each other in all of their adjusted positions, the brake pedal being slightly lower in its intermediate positions than the clutch pedal. Since, however, the arcs G and A are very close to each other, this variation in the relative positions of the pedals will be so small as to be indiscernable from the driver's seat.

A swinging support 75 preferably has a horizontal portion 76, Fig. 7, about which the throttle pedal 80 may swing when depressed by the foot of the vehicle driver. A spring 81 preferably is effective in holding the throttle pedal 80 in a normally released position in relation to the support. A downwardly and forwardly inclined arm 82 upon the throttle preferably extends through a slot 83ª in the floor board 84 and is articulated to a link 85 that is pivotally connected to a crank 86 upon a rotatable sleeve 87 carried on a shaft 88 projecting from the transmission housing. The outer end of this sleeve carries an arm 82ª which is connected to a carburetor control link 83.

It is thus evident that pivoting of the throttle member 80 about the support element 76 causes the sleeve 8 to rotate, thus swinging the arm 82ª and pulling the link 83 to open the throttle.

The swinging support 75 preferably has a bearing portion 90 pivotally mounted upon the primary support, and its lower end is provided with a slot 92 slidably engaging a fixed stud 91 carried by the side of the transmission housing. It is thus evident, as illustrated in Fig. 5, that movement of the primary support 1 about the shaft 5 as a center may cause a much greater movement of the pedal supporting portion 76 of member 75. Preferably the upper end of arm 86 is positioned at a point designated 86', Fig. 5, which forms the center of an arc R substantially forming the locus for the center of the upper end of link 85 in the various adjusted positions of the arm 75 when the throttle pedal is not depressed. When the pedal is fully depressed the arm 86 has its outer end positioned at a point designated 86″ which forms the center of an arc S substantially forming the loci of the various positions of the center of the upper end of link 85 when the pedal is fully depressed. Thus I have provided means permitting substantially the same amplitude of movement of the throttle pedal in each of its various adjusted positions. It is of course evident that the link 83 is connected to the usual throttle control linkage and the throttle is provided with the usual stop so that the link 83, crank member 86 and link 85 tend yieldably to be held in a predetermined normal inoperative position despite movement of the pedal due to the operation of the adjusting mechanism.

Fig. 6 illustrates a brake control linkage similar to that previously described but with the shaft 32 carrying a slotted crank arm 99 which is connected to the outer end of a piston rod 100 to permit the control of fluid in a hydraulic cylinder 101; thus Fig. 6 serves to illustrate how mechanism of this character may readily be employed with a hydraulic braking system.

Fig. 8 illustrates an optional mechanism which may be employed in place of the worm and nut arrangement to move and properly position the forward end of arm 6. As shown in Figs. 8 and 9, instead of a hand crank, a corrugated hand wheel 110 may be disposed behind the instrument board 20ᵃ with an edge projecting slightly below the same, thus providing substantially concealed yet readily engageable manual control means for adjusting the position of the control pedals. Such operating means may be employed in conjunction with the type of gearing shown in Fig. 1 or with the arangement illustrated in Figs. 8 and 9. This arrangement preferably employs a clutch and pinion element of the general type provided in the conventional window-lifting mechanisms which permits ready movement of the pinion in either direction in response to a similar movement of the manually controlled crank or handle but which locks automatically to prevent further movement of the pinion or connected parts as soon as the handle is released. Since such window operating mechanisms are conventional and well known, I do not deem it necessary to illustrate or describe the same in detail. One example of such a clutch arrangement is illustrated and described in the patent to Ternstedt No. 1,206,052. In order to permit the employment of mechanism of this character to support the much greater loads imposed thereon, for present purposes I provide suitable gear reduction mechanism which is operatively connected to the pinion 111 that is operated through the window-lifting clutch mechanism 109. Since the amplitude of movement of the end of arm 6 is comparatively limited, the gear reduction may be comparatively large without requiring many rotations of the hand controlled crank or wheel 110 in order to cause the movement of the control pedals through the maximum range of adjustment. Obviously with such leverage provided for the operating mechanism, the ultimate loads imposed upon the window-lifting mechanism need be no greater than those resulting from the conventional employment of such mechanism and may be less, if desired. As shown in Figs. 8 and 9, the pinion 111 may mesh with a much larger gear 112 carried upon a rotatable shaft 113, one end of which is mounted in a bearing upon a plate 114 secured to but having its intermediate portion spaced from the rear face of the instrument board 20ᵃ. The rear of this shaft may be rotatably mounted in a suitable bearing carried by a plate 119 secured to the dashboard 115 and may carry a pinion 117 meshing with a toothed sector 118 that is rotatable on a stub shaft 120 projecting from the plate 114. Preferably an outwardly extending arm 122 is fixed to the sector having its outer end articulated to a link 123. The forward extensions 7 of the arm 6, which in this case may be provided with slots 13ᵃ with closed ends, if desired, may receive a cross pin 129 that is pivotally connected to the link 123. If desired, any suitable auxiliary lateral guiding means may be provided to engage the sides of the arm 6, if this embodiment of the invention is employed.

Fig. 8 also illustrates a similar mechanism provided with a link 123ᵃ corresponding to the link 123 but pivotally connected to a collar 140 secured to the steering column 141. This steering column preferably rotates about the center of the steering gear housing upon the chassis frame in the well-known manner, and a slot 150 in the dashboard is provided with a reinforcing molding or channel 151 to form a guide and lateral support for the column in any of its various angular positions.

It is evident that control mechanism for the steering mechanism illustrated in Fig. 8 may be employed with the control mechanism for the pedals illustrated in Fig. 1, if desired.

Mere angular adjustment of the steering column does not meet the requirements of all users; in fact, adjustment of the position of the wheel longitudinally of the column is at least equally important. I therefore preferably provide a steering wheel 170 which also is adjustable so that the rim of the same may be located in either one of two positions to provide an effect similar to that which would be attained by lengthening or sortening the steering column. For this purpose the steering spider 171 preferably is provided with comparatively thin and wire resilient spoke portions 172 and with a comparatively rigid rim 173 which may have a tubular metal core 176. The outer ends of the spokes preferably are formed into eyes 175 encircling this metal core, and the normal length of these springs is greater than the radius of the core, the resilient spider being tempered to have a normally unstressed substantially flat shape so that when secured to core 176 the spokes are curved or bowed and are stressed, thus causing the positioning of the rim and spokes as illustrated in full lines, for example, in Fig. 10 or as illustrated in dot and dash lines in this figure. Due to the arrangement of this spring means a force applied to the steering wheel rim perpendicular to its plane will be effective in causing the same to snap from a position wherein the spokes are bowed in one direction to a position wherein they are bowed in the other direction, thus permitting an appreciable change in the position of the outer portion of the steering wheel. Preferably the rim of the wheel between the spokes is covered with a layer of any suitable material, such as molded rubber 179, and suitable clips 180 which may be formed of cellulosic material are disposed about the portions 175 of the spokes that encircle the core of the rim, the surfaces of these clips being substantially aligned with the surface of the coating material 179 so that the rim of the wheel has a substantially continuously finished outer face.

From the foregoing it is evident that I have provided means permitting the ready adjustment of the control pedals in unison and also the adjustment of the steering wheel. Thus, for example, rotation of the crank 24 shown in Fig. 1 serves to rotate the worm 16, thus varying the position of nut 11, arm 6, and the primary support 1. Movement of the primary support 1 due to the arrangement of the linkage causes a much greater amplitude of the movement of the brake and clutch pedals while substantially avoiding any change in the relative operative relationship of the brake and clutch linkages and their respective operating pedals. Furthermore, this movement of the primary support 1 is effective in swinging member 75 to vary the position of the throttle, the linkage connected with the same also being so arranged that the angular movement of the same from fully closed to fully opened position is substantially the same in any one of its adjusted positions.

Furthermore, if desired conventional window-lifting mechanism may be employed rather than the irreversible mechanism illustrated in Fig. 1. In this form of the invention, which is illustrated in Figs. 8 and 9, rotation of the member 110 for a few revolutions is effective in causing a small angular movement of the arm 122 and accordingly a vertical movement of link 123, thus causing a corresponding movement of the forward end of arm 6. While I have illustrated operating mechanism involving the use of a window lifter clutch for positioning the steering column, it is evident that any other suitable mechanism involving the suitable mechanical advantage and irreversibility may be employed for this purpose (by "irreversibility" applicant means the characteristic which permits the mechanism to be moved in either direction by the control device but prevents such movement due to pressure received from the control elements; thus the term "irreversibility" as herein used is employed in the same sense as when employed to denote an irreversible steering gear).

While in the present disclosure I have illustrated a typical layout of the various linkages, it is evident that the same may be widely varied without departing from the spirit of this invention, and, for example, the control linkage for the brake may be changed in any desired way.

It is apparent that I have provided means permitting the ready manual adjustment of all of the control pedals in unison to permit the position of the same to be accommodated to the desires of drivers of different heights or those who prefer to occupy widely different driving positions, and that the operation of this mechanism does not require great effort and that the mechanism, when once operated, may be effective in ensuring retention of the control members in the selected position. Furthermore, similar means may be provided independently to position the steering column and; if desired, the steering spider illustrated herein permits the employment of means permitting an additional adjustment of the steering wheel which may be instantaneously effective, this spider having the additional advantage of being resilient and thus absorbing driving shocks that are otherwise transferred through the steerage linkage and mechanism to the forearms of the driver. Accordingly means are provided permitting the uttermost convenience and flexibility in the positioning of the controls, not only in relation to the seat, but in relation to each other.

I claim:

1. In a vehicle, a plurality of control pedals, and means for adjustably positioning each of said pedals in any one of a plurality of selected positions whereby the pedals may be conveniently located for persons of different heights, said means being arranged to effect concomitant movement of all of said pedals.

2. In a vehicle, a foot pedal, a support for the same, linkage operatively connected to the pedal, means for holding the support in a plurality of positions to permit the pedal to be adjusted to a plurality of positions, and manually operable means for positioning said holding means.

3. In a vehicle, a foot pedal, a support for the same, linkage operatively connected to the pedal, means for holding the support in a plurality of positions to permit the pedal to be adjusted to a plurality of positions, and manually operable means for positioning said holding means, said manually operable means being arranged to be self-locking so that the holding means is automatically maintained in the position to which it is moved.

4. In a vehicle, an engine control pedal and a drive control pedal, a common support for the same, means for holding said support and permitting the same to move along a predetermined path, and manually operable means to position said holding means and said support whereby the position of said pedals may be varied to permit convenient operation of the same by persons of different heights.

5. In a vehicle, a brake pedal and a clutch pedal, a common support about which the same may rotate, holding means for said support, manually operable means for moving said holding means to a plurality of positions and thereby to vary the positions of said pedals, and means associated with the adjusting means to maintain the holding means in a selected position.

6. In a vehicle, a brake pedal and a clutch pedal, a common support about which the same may rotate, holding means for said support, manually operable adjusting means for moving said holding means to a plurality of positions and thereby to vary the positions of said pedals, means associated with the adjusting means to maintain the holding means in a selected position, said pedals carrying arms that swing about the support, links connected to the arms and to control linkage, and means yieldably holding the portion of the linkage to which the links are connected in a predetermined position whereby relative movement of the support in relation to the links causes relative movement of the pedals and the support.

7. In a vehicle, a pedal, a support about which the pedal is swung upon operation thereof, manually operable means for positioning the support in a plurality of positions, and linkage connected to the pedal in such a manner that relative movement between the support and linkage due to a movement of the former causes relative movement between the pedal and the support.

8. In a vehicle, a control pedal, a support upon which the pedal is pivotally mounted, manually operable means for adjusting the position of the said support in any one of a plurality of selected positions along a predetermined path, and control linkage connected to the pedal, said control linkage being so arranged in relation to the pedal that the latter will have substantially the same range of movement to operate the linkage in each one of a plurality of selected positions of the support.

9. In a vehicle, a pedal, a pivotal support about which the pedal swings, manually operable means for positioning the support in each one of a plurality of positions, an outstanding arm carried by the pedal, a link connected thereto, the connection of the link and the pedal having a definite arc of movement about the pivotal support in each one of the selected positions of the pedal, and a control member connected to the remote end of the link, the connection between the pedal arm and the link moving in a path substantially in a direction in alignment with a straight line extending between the connections of the link to the pedal arm and to the control member respectively when the pedal is actuated, whereby the arc of movement of said connection between the arm and the link is disposed substantially in tangential relationship to the extent of the link in each one of the adjusted positions of the pedal and the support.

10. In a vehicle, a brake pedal, a clutch pedal, and a throttle pedal, a primary support for said pedals, said brake pedal and clutch pedal being rotatable about said support, an intermediate supporting member upon which the throttle pedal is pivotally mounted, said intermediate supporting member being pivotally mounted upon said primary support, a fixed element engaging another portion of said intermediate support whereby the portion of the same upon which the throttle is pivotally mounted follows a curved path in response to movement of the primary support, and manually controllable means for adjusting the primary support in any one of a plurality of positions whereby the clutch and brake pedals may be positioned to meet the requirements of persons of different heights and whereby the intermediate support swings the throttle pedal in a direction corresponding to the directon of adjustment of the other pedals.

11. In a vehicle, a primary support, a pedal rotatable about said support, a swinging arm upon which the support is carried, and mechanism for adjustably positioning the arm in any one of a plurality of positions.

12. In a vehicle, a primary support, a pedal rotatable about said support, a swinging arm upon which the support is carried, mechanism for adjustably positioning the arm in any one of a plurality of positions, and control linkage connected to the pedal and causing relative movement of the same and the arm, when the latter is moved.

13. In a vehicle, a control pedal, a swinging support for the same, a pedal pivotally mounted on the support, a fixed member engaging a portion of the support, a movable member engaging the same, the support having a pivotal engagement with one of said members and a sliding engagement with the other, and means to cause movement of the support in relation to said members.

14. In a vehicle, a pedal, a movable support upon which the pedal is pivotally mounted, control linkage connected to the pedal, means for adjusting the support in any one of a plurality of positions, an extension of the pedal articulated to a link, a swinging arm connected to the opposite end of the link, said pedal being movable through substantially the same angle in each of the adjusted positions of the support to swing the arm an equal amount in response to an equal depression in each of said positions.

15. In a vehicle, a pedal, a pivotal support about which the pedal swings, a part upon which the support is mounted, manually operable mechanism effective to move the part and the support therewith, the pedal having an extension adjoining the support, a link connected thereto, the connection of the link and pedal having a definite arc of movement about the support in each one of the positions of said part, a control member connected to the remote end of the link, the connection between the pedal extension and the link moving in a path substantially in the direction of a straight line extending between said connection and the connection of the link with the control member when the pedal is actuated, the movement of the support as said part is moved by the mechanism being effective in moving the connection of the link and pedal extension through an arc having its center determined by the connection of the opposite end of the link with said control part, the control part having a similar range of movement for a given pedal movement in each of the various adjusted positions of the support upon which the pedal is pivotally mounted.

16. In a vehicle, a pedal, a pivot support about which the pedal swings, manually operable means for positioning the support in any one of a plurality of selected positions, an outstanding arm carried by the pedal, a link connected thereto, a swinging control member with a pivotal connection to the opposite end of the link, said control member having a definite range of movement affording an arcuate path for said connection, the pedal having a movement about its pivotal support in each of the adjusted positions of the support effective to move the control member through said range, the various positions of the connection between the link and the outstanding pedal arm in various adjusted positions of the pedal substantially defining an arc about a center defined by the pivotal connection of the opposite end of the link with the control member when the control member is at one end of its range of movement and similarly defining an arc of similar radius when the control member is at the other end of its range of movement, whereby the pedal in any of its adjusted positions may have substantially the same movement to cause a given movement of the control member.

R. L. CARR.

DISCLAIMER 1,929,409.—*Raymond L. Carr*, Boston, Mass. VEHICLE CONTROL ARRANGEMENT. Patent dated October 10, 1933. Disclaimer filed August 28, 1934, by the patentee.

Hereby enters this disclaimer.

Disclaims the respective subject matter of claims 1, 2, 3 and 8 except as applied to a land vehicle.

[*Official Gazette September 18, 1934.*]